(12) United States Patent
Dingli (10) Patent No.: US 11,872,870 B2
(45) Date of Patent: Jan. 16, 2024

(54) TREATING AIR INSIDE A VEHICLE

(71) Applicant: Pony AI Inc., Grand Cayman (KY)

(72) Inventor: Robert Dingli, Cupertino, CA (US)

(73) Assignee: Pony AI Inc., Grand Cayman (KY)

( * ) Notice: Subject to any disclaimer, the term of this patent is extended or adjusted under 35 U.S.C. 154(b) by 1055 days.

(21) Appl. No.: 16/671,021

(22) Filed: Oct. 31, 2019

(65) Prior Publication Data

US 2021/0129633 A1 May 6, 2021

(51) Int. Cl.
*B60H 3/00* (2006.01)
*B60H 1/26* (2006.01)
*B60W 10/30* (2006.01)

(52) U.S. Cl.
CPC ............. *B60H 3/0085* (2013.01); *B60H 1/26* (2013.01); *B60H 3/0007* (2013.01); *B60W 10/30* (2013.01)

(58) Field of Classification Search
CPC ....... B60H 3/0085; B60H 3/0007; B60H 1/26
USPC ........................................................ 454/75
See application file for complete search history.

(56) References Cited

U.S. PATENT DOCUMENTS

| 9,740,967 | B2 | 8/2017 | Gong | |
|---|---|---|---|---|
| 10,281,167 | B2 | 5/2019 | Martin | |
| 2006/0263255 | A1* | 11/2006 | Han | B82Y 30/00 422/83 |
| 2018/0057013 | A1* | 3/2018 | Mullett | B60H 1/267 |
| 2018/0319406 | A1* | 11/2018 | Dudar | B60H 1/00357 |
| 2018/0334013 | A1* | 11/2018 | Koravadi | B60H 1/00849 |
| 2019/0193528 | A1* | 6/2019 | Hattori | B60H 3/06 |
| 2020/0180387 | A1* | 6/2020 | Sarma | B60H 1/00007 |
| 2020/0198444 | A1* | 6/2020 | Schmidt | B60H 3/0035 |

* cited by examiner

*Primary Examiner* — Steven B McAllister
*Assistant Examiner* — Charles R Brawner (57) ABSTRACT

Provided herein is a system on a vehicle, the system comprising one or more sensors configured to monitor concentrations of each of one or more chemicals in an interior of a vehicle, one or more processors, and a memory storing instructions that, when executed by the one or more processors, causes the system to perform: one or both of ventilating the interior of the vehicle and applying heat in the interior of the vehicle in response to one or more of the concentrations being higher than respective thresholds; in response to the performing one or both of ventilating and applying the heat in the interior of the vehicle, cleaning the interior of the vehicle in response to determining that any of the one or more of the concentrations remain higher than the respective thresholds.

18 Claims, 7 Drawing Sheets

TREATING AIR INSIDE A VEHICLE

TECHNICAL FIELD

The present disclosure relates generally to vehicles such as autonomous vehicles (AVs) that monitor air quality, including concentrations of harmful and/or odorous gases, inside the vehicles and improving the air quality inside the vehicles.

BACKGROUND

Currently, vehicles such as autonomous vehicles may accumulate harmful and/or odorous gases within their respective interiors. Such gases may originate from a new car smell, passengers, and/or air pollution. If the gases remain in the vehicles, drivers and passengers will not only experience discomfort and annoyance but will also be exposed to health risks. Currently, one drawback of autonomous vehicles is that neither cleaning nor other strategies to counter the gases are implemented, so that the gases may remain in the vehicles. For example, robotaxis may not clean or purge the air inside before picking up new customers. These shortfalls are addressed by the present disclosures, which provide an efficient and effective system and method of purging or removing gases in an interior of a vehicle.

SUMMARY

Described herein are systems and methods for a vehicle to monitor concentrations of harmful and/or odorous gases inside a vehicle and to reduce the concentrations of the harmful and/or odorous gases. Various embodiments of the present disclosure provide a system of a vehicle comprising: one or more sensors; one or more processors; and a memory storing instructions that, when executed by the one or more processors, causes the system to perform: one or both of ventilating the interior of the vehicle and applying heat in the interior of the vehicle in response to one or more of the concentrations being higher than respective thresholds; in response to the performing one or both of ventilating and applying the heat in the interior of the vehicle, determining whether any of the one or more of the concentrations remain higher than the respective thresholds; and in response to determining that any of the one or more of the concentrations remain higher than the respective thresholds, cleaning the interior of the vehicle.

In some embodiments, the instructions further cause the system to perform: in response to determining that any of the one or more of the concentrations remain higher than the respective thresholds, moving the vehicle to a different location.

In some embodiments, the one or more sensors are configured to monitor rates of changes in the concentrations of each of the one or more chemicals in the interior of the vehicle; and the instructions further cause the system to perform: one or both of ventilating the interior of the vehicle and applying the heat in the interior of the vehicle in response to one or more of the rates of changes being higher than second respective thresholds.

In some embodiments, the performing one or both of ventilating the interior of the vehicle and applying the heat in the interior of the vehicle comprises controlling an amount of external air based on respective amounts by which the one or more of the concentrations deviate from the respective thresholds, and based on an air quality index of the external air.

In some embodiments, at least one of the one or more sensors comprises a nanotube.

In some embodiments, the nanotube is disposed in between a source and a drain, and on top of a dielectric and a gate electrode.

In some embodiments, the nanotube is disposed between an electrolyte and a substrate, and between a source and a drain.

In some embodiments, the one or more chemicals comprise fluorine, benzene, sulfur, formaldehyde, bromine, chlorine, or lead.

In some embodiments, the cleaning the interior of the vehicle comprises cleaning the interior of the vehicle at a cleaning station.

In some embodiments, the cleaning the interior of the vehicle comprises releasing a cleaning compound specific to the one or more chemicals having respective concentrations above respective thresholds.

In some embodiments, the moving the vehicle to a different location comprises determining a destination to move the vehicle to, based on an air quality index of the destination, a distance to the destination, and a density of vehicles at the destination.

Various embodiments of the present disclosure provide a method implemented on a vehicle by a computing system including one or more processors and storage media storing machine-readable instructions, wherein the method is performed using the one or more processors. The method may comprise: monitoring concentrations, using one or more sensors, of each of one or more chemicals in an interior of a vehicle; performing one or both of ventilating the interior of the vehicle and applying heat in the interior of the vehicle in response to one or more of the concentrations being higher than respective thresholds; in response to the performing one or both of ventilating the interior of the vehicle and applying the heat in the interior of the vehicle, determining whether any of the one or more of the concentrations remain higher than the respective thresholds; and in response to determining that any of the one or more of the concentrations remain higher than the respective thresholds, cleaning the interior of the vehicle.

In some embodiments, the method further comprises, in response to determining that any of the one or more of the concentrations remain higher than the respective thresholds, moving the vehicle to a different location.

In some embodiments, the method further comprises, monitoring rates of changes, using the one or more sensors, in the concentrations of each of the one or more chemicals in the interior of the vehicle; and performing one or both of ventilating the interior of the vehicle and applying the heat in the interior of the vehicle in response to one or more of the rates of changes being higher than second respective thresholds.

In some embodiments, the performing one or both of ventilating the interior of the vehicle and applying the heat in the interior of the vehicle comprises controlling an amount of external air based on respective amounts by which the one or more of the concentrations deviate from the respective thresholds, and based on an air quality index of the external air.

In some embodiments, the monitoring the concentrations of each of one or more chemicals in an interior of the vehicle comprises monitoring using a sensor comprising a nanotube.

In some embodiments, the monitoring comprises monitoring using the sensor comprising the nanotube disposed between a source and a drain, and on top of a dielectric and a gate electrode.

In some embodiments, the monitoring comprises monitoring using the sensor comprising the nanotube disposed between an electrolyte and a substrate, and between a source and a drain.

In some embodiments, the monitoring the concentrations of each of one or more chemicals in the interior of the vehicle comprises monitoring the concentrations of fluorine, benzene, sulfur, formaldehyde, bromine, chlorine, or lead.

In some embodiments, the cleaning the interior of the vehicle comprises cleaning the interior of the vehicle at a cleaning station.

In some embodiments, the cleaning the interior of the vehicle comprises releasing a cleaning compound specific to the one or more chemicals having respective concentrations above respective thresholds.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

In general, a vehicle (e.g., an autonomous vehicle, a driverless vehicle, etc.) can have myriad sensors onboard the vehicle. The myriad sensors can include light detection and ranging sensors (or LiDARs), radars, cameras, GPS, sonar, ultrasonic, IMU (inertial measurement unit), accelerometers, gyroscopes, magnetometers, FIR (far infrared) sensors, etc. The myriad sensors can play a central role in functioning of an autonomous or driverless vehicle. For example, LiDARs can be utilized to detect and identify objects (e.g., other vehicles, road signs, pedestrians, buildings, etc.) in a surrounding. LiDARs can also be utilized to determine relative distances of the objects in the surrounding. For another example, radars can be utilized to aid with collision avoidance, adaptive cruise control, blind side detection, assisted parking, etc. For yet another example, a camera can be utilized to recognize, interpret, and/or analyze contents or visual cues of the objects. Cameras and other optical sensors can capture image data using charge coupled devices (CCDs), complementary metal oxide semiconductors (CMOS), or similar elements. An IMU may detect abnormal occurrences such as a bump or pothole in a road. Data collected from these sensors can then be processed and used, as inputs, to make driving decisions (e.g., acceleration, deceleration, direction change, etc.). For example, data from these sensors may be further processed into an image histogram of a graphical representation of tonal distribution in an image captured by the one or more sensors.

Various embodiments overcome problems specifically arising in the realm of autonomous vehicle technology. Sensors on a vehicle may assist in finding a stop point (parking spot, drop off or pick up point). In various embodiments, the myriad sensors (e.g., LiDARs, radars, cameras, etc.) onboard the autonomous vehicle can be encased or housed in an enclosure. The enclosure allows the myriad sensors to be moved from one vehicle to another vehicle in a single act, rather than to move the myriad sensors one by one. In some embodiments, the enclosure can be installed or mounted onto a fixture of the autonomous vehicle. For example, the enclosure can be installed or mounted onto a roof rack or a custom rack fitted to the autonomous vehicle. The enclosure can be translated or moved along the fixture. In some embodiments, the enclosure is made of a material that is transparent to electromagnetic waves receptive to the myriad sensors encased by the enclosure. For example, the enclosure can be made from a transparent material that allows laser lights, radio waves, and visible lights emitted and/or received by the LiDARs, the radars, and the cameras, respectively, to enter and/or exit the enclosure.

Figure 1:
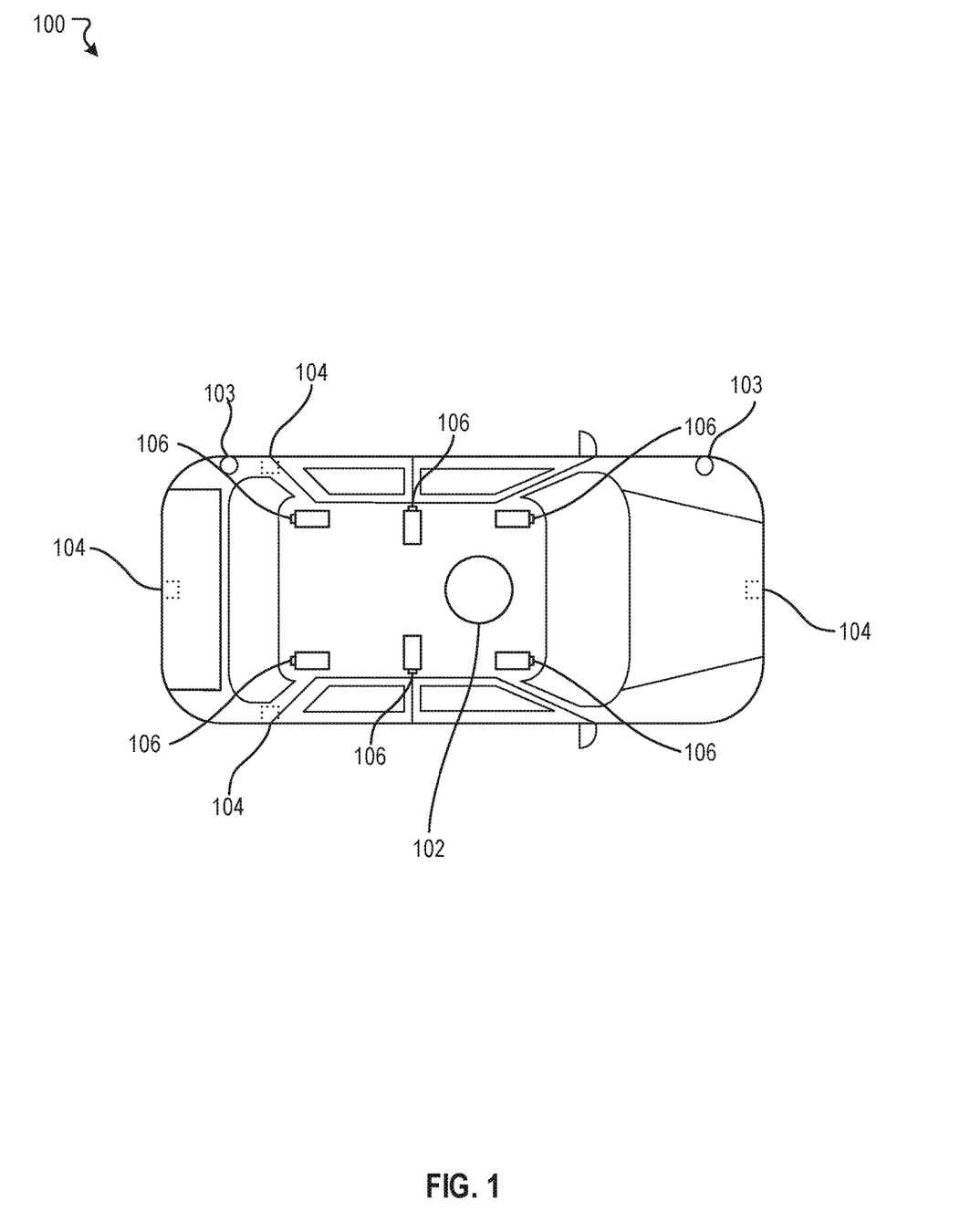
FIG. 1 illustrates an example vehicle, such as an autonomous vehicle (AV), according to an embodiment of the present disclosure.

FIG. 1 illustrates an example vehicle 100 such as an autonomous vehicle, according to an embodiment of the present disclosure. A vehicle 100 generally refers to a category of vehicles that are capable of sensing and driving in a surrounding by itself. The vehicle 100 can include myriad sensors (e.g., LiDARs, radars, cameras, etc.) to detect and identify objects in the surrounding. Such objects may include, but not limited to, pedestrians, road signs, traffic lights, and/or other vehicles, for example. The vehicle 100 can also include myriad actuators to propel and navigate the vehicle 100 in the surrounding. Such actuators may include, for example, any suitable electro-mechanical devices or systems to control a throttle response, a braking action, a steering action, etc. In some embodiments, the vehicle 100 can recognize, interpret, and analyze road signs (e.g., speed limit, school zone, construction zone, etc.) and traffic lights (e.g., red light, yellow light, green light, flashing red light, etc.). For example, the vehicle 100 can adjust vehicle speed based on speed limit signs posted on roadways. In some embodiments, the vehicle 100 can determine and adjust speed at which the vehicle 100 is traveling in relation to other objects in the surroundings. For example, the vehicle 100 can maintain a constant, safe distance from a vehicle ahead (e.g., adaptive cruise control). In this example, the vehicle 100 maintains this safe distance by constantly adjusting its vehicle speed to that of the vehicle ahead.

In various embodiments, the vehicle 100 may navigate through roads, streets, and/or terrain with limited or no human input. The word "vehicle" or "vehicles" as used in this paper includes vehicles that travel on ground (e.g., cars, trucks, bus, etc.), but may also include vehicles that travel in air (e.g., drones, airplanes, helicopters, etc.), vehicles that travel on water (e.g., boats, submarines, etc.). Further, "vehicle" or "vehicles" discussed in this paper may or may not accommodate one or more passengers therein. Moreover, phrases "autonomous vehicles," "driverless vehicles," or any other vehicles that do not require active human involvement can be used interchangeably.

In general, the vehicle 100 can effectuate any control to itself that a human driver can on a conventional vehicle. For example, the vehicle 100 can accelerate, brake, turn left or right, or drive in a reverse direction just as a human driver can on the conventional vehicle. The vehicle 100 can also sense environmental conditions, gauge spatial relationships (e.g., distances between objects and itself), detect and analyze road signs just as the human driver. Moreover, the vehicle 100 can perform more complex operations, such as parallel parking, parking in a crowded parking lot, collision avoidance, etc., without any human input.

In various embodiments, the vehicle 100 may include one or more sensors. As used herein, the one or more sensors may include laser scanning systems (e.g., LiDARs) 102, ultrasonic sensors 103, radar systems 104, camera systems 106, GPS, sonar, IMU (inertial measurement unit), accelerometers, gyroscopes, magnetometers, FIR (far infrared) sensors, and/or the like. The one or more sensors allow the vehicle 100 to sense an environment around the vehicle 100. For example, the LiDARs 102 can generate a three-dimensional map of the environment. The LiDARs 102 can also detect objects in the environment. In the example of FIG. 1, the vehicle 100 is shown with four radar systems 104. Two radar systems are coupled to a front-side and a back-side of the vehicle 100, and two radar systems are coupled to a right-side and a left-side of the vehicle 100. In some embodiments, the front-side and the back-side radar systems can be configured for adaptive cruise control and/or accident avoidance. For example, the front-side radar system can be used by the vehicle 100 to maintain a healthy distance from a vehicle ahead of the vehicle 100. In another example, if the vehicle ahead experiences a sudden reduction in speed, the vehicle 100 can detect this sudden change in motion and adjust its vehicle speed accordingly. In some embodiments, the right-side and the left-side radar systems can be configured for blind-spot detection. In the example of FIG. 1, the vehicle 100 is shown with six camera systems 106 on a roof of the vehicle 100. Two camera systems are coupled to the front-side of the roof of the vehicle 100, two camera systems are coupled to the back-side of the roof of the vehicle 100, and two camera systems are coupled to the right-side and the left-side of the roof of the vehicle 100. In some embodiments, the front-side and the back-side camera systems can be configured to detect, identify, and decipher objects, such as cars, pedestrian, road signs, in the front and the back of the vehicle 100. For example, the front-side camera systems can be utilized by the vehicle 100 to determine speed limits. In some embodiments, the right-side and the left-side camera systems can be configured to detect objects, such as lane markers. For example, side camera systems can be used by the vehicle 100 to ensure that the vehicle 100 drives within its lane.

Figure 2:
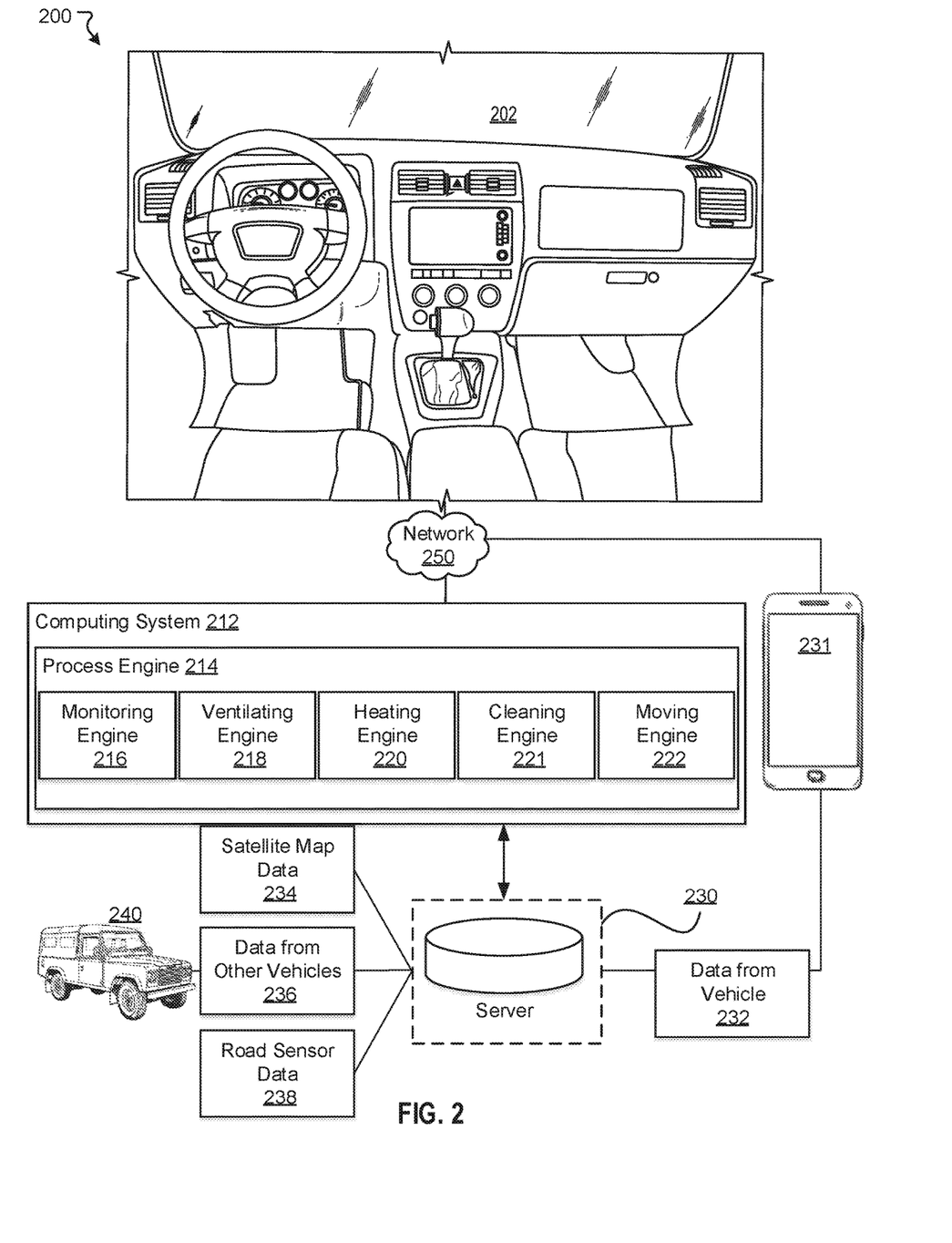
FIG. 2 illustrates an example environment of a system that monitors concentrations of one or more chemicals in an interior of a vehicle and reduces any of the concentrations of the one or more chemicals that are above respective thresholds.

FIG. 2 illustrates an example environment 200 of a system that monitors concentrations of one or more chemicals in an interior of a vehicle 202 and reduces any of the concentrations of the one or more chemicals that are above respective thresholds. In various embodiments, the vehicle 202 may be implemented as vehicle 100. The vehicle 202 may utilize its sensors including LiDAR, radar, camera, GPS, and/or ultrasonic sensors, as described with respect to the vehicle 100, to obtain data. Additionally, the vehicle 202 may comprise sensors that monitor concentrations of each of one or more chemicals in the interior of the vehicle 202, as will be described below. The vehicle 202 may be connected, over a network 250, to at least one computing system 212 that includes one or more processors and memory, and to a device 231. In some embodiments, the at least one computing system 212 may be physically and/or electrically connected to the vehicle 202. In some embodiments, the computing system 212 may be integrated as part of the vehicle 202. One or more users may, through a device 231, request, view, and/or access details of the interior of the vehicle 202, including concentrations of each of one or more chemicals in the interior of the vehicle 202 over time and rates of change of the respective concentrations of each of one or more chemicals. The processors may be configured to perform various operations by interpreting machine-readable instructions. In some embodiments, the example environment 200 may be implemented as a data platform. In some embodiments, the example environment 200 may be configured to interact with computing systems of the data platform. In various embodiments, one or more computing systems 212 of the data platform may coordinate and/or control one or more operations of a robotaxi or ridesharing service.

In some embodiments, the computing system 212 may include a process engine 214. The process engine 214 may include a monitoring engine 216, a ventilating engine 218, a heating engine 220, a cleaning engine 221, and a moving engine 222. The process engine 214 may be executed by the processor(s) of the computing system 212 to perform various operations including those operations described in reference to the monitoring engine 216, the ventilating engine 218, the heating engine 220, the cleaning engine 221, and the moving engine 222. In general, the process engine 214 may be implemented, in whole or in part, as software that is capable of running on one or more computing devices or systems. In one example, the process engine 214 may be implemented as or within a software application running on one or more computing devices (e.g., user or client devices) and/or one or more servers (e.g., network servers or cloud servers, servers 230). In some instances, various aspects of the monitoring engine 216, the ventilating engine 218, the heating engine 220, the cleaning engine 221, and the moving engine 222 may be implemented in one or more computing systems and/or devices. In some instances, one or more of the monitoring engine 216, the ventilating engine 218, the heating engine 220, the cleaning engine 221, and the moving engine 222 may be combined or integrated into a single processor, and some or all functions performed by one or more of the monitoring engine 216, the ventilating engine 218, the heating engine 220, the cleaning engine 221, and the moving engine 222 may not be spatially separated, but instead may be performed by a common processor. The environment 200 may also include the one or more servers 230 accessible to the computing system 212. The one or more servers 230 may store pictorial and map data 232 from the vehicle 202, satellite map data 234 from one or more satellite maps, other vehicle data 236 from one or more sensors of another vehicle 240, and/or road sensor data 238 from one or more road sensors such as sensors on traffic lights. In some embodiments, the one or more servers 230 may integrate data from different sensors. In other embodiments, the one or more servers 230 may keep the data from the different sensors separate. The one or more servers 230 may be accessible to the computing system 212 either directly or over the network 250. In some embodiments, the one or more servers 230 may store data that may be accessed by the process engine 214 to provide the various features described herein. In some embodiments, the one or more servers 230 may store data of concentrations of chemicals at specific times in the interior of the vehicle 202. In some instances, the one or more servers 230 may include federated data stores, databases, or any other type of data source from which data may be stored and retrieved, for example. In some implementations, the one or more servers 230 may include various types of data sets on which determinations of accuracy or consistency with other information can be made. In general, a user operating a computing device can interact with the computing system 212 over the network 250, for example, through one or more graphical user interfaces and/or application programming interfaces.

The monitoring engine 216 may comprise one or more sensors. The monitoring engine 216, in some examples, may comprise a smoke detector. The monitoring engine 216 may be configured to obtain sensor data, for example, concentrations of each of one or more chemicals inside the vehicle 202 at specific times, and may store the sensor data in the one or more servers 230. The monitoring engine 216 may be configured to monitor the concentrations of fluorine, benzene, sulfur, formaldehyde, brome, chlorine, lead, other volatile organic compounds, and/or other harmful or odorous gases. The monitoring engine 216 may further be configured to obtain rates of changes in the concentrations of each of the one or more chemicals inside the vehicle 202 with respect to time. The monitoring engine 216 may send information of the concentrations, and the rates of changes in the concentrations, to the ventilating engine 218, the heating engine 220, the cleaning engine 221, and the moving engine 222, such as information of whether one or more of the concentrations are higher than respective thresholds, and/or if one or more of the rates of changes of the concentrations are higher than respective second thresholds. The monitoring engine 216 may continuously obtain data of the concentrations or the rates of changes in the concentrations, or obtain the data concentrations or the rates of changes in the concentrations at discrete time intervals. The monitoring engine 216 may increase a sampling rate of obtaining the data in response to determining that one or more concentrations are higher than respective thresholds. The obtained data may further comprise timestamp data indicating a time of capture of the data. The monitoring engine 216 may further obtain information of road conditions, traffic conditions, and/or environmental conditions (e.g., density of other vehicles, air quality index). The monitoring engine 216 may obtain an image or images captured from the one or more sensors, or one or more specific features (such as other vehicles, trees, road, grass, landmarks, people, inanimate objects) extracted from the image. The one or more sensors of the monitoring engine 216 may also detect a vehicle speed, a vehicle direction, a vehicle acceleration, a vehicle rotation, and/or a vehicle location. The monitoring engine 216 may detect whether or not the vehicle 202 is occupied. The monitoring engine 216 may be completely or partially turned on when the vehicle 202 is powered off in order to detect potential hazards or conditions even when the vehicle is not on. The monitoring engine 216 may include an object detection system that operates while the vehicle 202 is turned off to detect stationary objects or entities or moving objects, features, or entities. When the vehicle is not on and the monitoring engine 216 is partially turned off, data may instead be obtained from the server 230. The data may include the satellite map data 234, the other vehicle data 236, and the road sensor data 238. More information regarding the one or more sensors of the monitoring engine 216 will be discussed with respect to FIGS. 3A-3H.

In some embodiments, the ventilating engine 218 may receive information, from the monitoring engine 216, of the concentrations, and the rates of changes in the concentrations, such as information of whether one or more of the concentrations are higher than respective thresholds, and/or if one or more of the rates of changes of the concentrations are higher than respective second thresholds. The ventilating engine 218 may be configured to provide continuous ventilation for a predetermined period of time, and/or provide discrete bursts of ventilation, such as five second intervals during which ventilation is provided alternating with five second intervals in which no ventilation is provided. If the ventilating engine 218 receives information that one or more of the concentrations are higher than respective thresholds, the ventilating engine 218 may control the vehicle 202 to provide or increase ventilation to the interior of the vehicle 202. In some embodiments, the ventilating engine 218 may provide or increase ventilation when the vehicle 202 is not occupied with people, such as passengers, without providing or increasing ventilation when the vehicle 202 is occupied with people. In some embodiments, the ventilating engine 218 may provide or increase ventilation regardless of whether people are occupying the vehicle 202. In some embodiments, the ventilating engine 218 may adjust an amount and/or length of ventilation based on whether people are occupying the vehicle 202. In some examples, a greater number of people occupying the vehicle 202 may result in the ventilating engine 218 providing a larger amount and/or length of ventilation in the vehicle 202, and vice versa. In some embodiments, the ventilating engine 218 may control an amount and/or length of ventilation based on an amount and/or length of heat provided to the vehicle 202, for example, according to a control of the heating engine 220. In some embodiments, the ventilating engine 218 may regulate an amount and/or length of ventilation, or an amount of external air that enters the vehicle 202, based on amounts by which the one or more of the concentrations deviate from the respective thresholds, or amounts by which the one or more rates of changes deviate from the respective second thresholds, and/or based on an air quality index of the external air. In some examples, if a concentration of a chemical, such as sulfur, exceeds a threshold concentration of sulfur by a larger amount, the ventilating engine 218 may increase the amount and/or length of ventilation by a larger amount compared to the scenario in which the concentration of sulfur only exceeds the threshold concentration by a smaller amount. In some examples, if a rate of change of a concentration of a chemical, such as sulfur, exceeds a threshold rate of change of the concentration of sulfur by a larger amount, the ventilating engine 218 may increase the amount and/or length of ventilation by a larger amount compared to the scenario in which the rate of change of the concentration of sulfur only exceeds the threshold concentration by a smaller amount. In some examples, if the air quality index is lower, indicating a higher air quality, the ventilating engine 218 may increase the amount and/or length of ventilation by a larger amount compared to the scenario in which the air quality index is higher. In some embodiments, the ventilating engine 218 may provide or increase the amount of ventilation until all concentrations of gases are equal to or below respective thresholds, or, if the concentrations of gases are in steady states. In some examples, if the concentrations of one or more gases are still above respective thresholds, but the concentrations are not decreasing, the ventilating engine 218 may stop providing or increasing the amount of ventilation. The ventilating engine 218 may provide and/or increase the amount of ventilation by controlling the opening of windows, increasing airflow through a cabin vent, other vent, or duct connected to an interior of the vehicle 202.

In some embodiments, the heating engine 220 may receive information, from the monitoring engine 216, of the concentrations, and the rates of changes in the concentrations, such as information of whether one or more of the concentrations are higher than respective thresholds, and/or if one or more of the rates of changes of the concentrations are higher than respective second thresholds. The heating engine 220 may be configured to control an amount of heat and duration, or length, for which the heat is provided. The heating engine 220 may be configured to provide continuous heat for a predetermined period of time, and/or provide discrete bursts of heat, such as alternating bursts of 100 Joules of heat for five seconds, followed by five second intervals with no application of heat. If the heating engine 220 receives information that one or more of the concentrations are higher than respective thresholds, the heating engine 220 may control the vehicle 202 to provide or increase heat to the interior of the vehicle 202. In some embodiments, the heating engine 220 may provide or increase the heat when the vehicle 202 is not occupied with people, such as passengers, without providing or increasing the heat when the vehicle 202 is occupied with people. In some embodiments, the heating engine 220 may provide or increase the heat regardless of whether people are occupying the vehicle 202. In some embodiments, the heating engine 220 may adjust an amount and/or length of a heat application based on whether people are occupying the vehicle 202. In some examples, a greater number of people occupying the vehicle 202 may result in the heating engine 220 providing a larger amount and/or length of the heat application in the vehicle 202, and vice versa. In some embodiments, the heating engine 220 may control an amount and/or length of the heat application based on an amount and/or length of ventilation provided to the vehicle 202, for example, according to a control of the ventilating engine 218. In some embodiments, the heating engine 220 may synchronize the heat application with the ventilation provided so that the heat application occurs at a same time and overlaps with the application of the ventilation. In some embodiments, the heating engine 220 may regulate an amount and/or length of the heat application, based on amounts by which the one or more of the concentrations deviate from the respective thresholds, or amounts by which the one or more rates of changes deviate from the respective second thresholds, and/or based on an external temperature. In some examples, if a concentration of a chemical, such as sulfur, exceeds a threshold concentration of sulfur by a larger amount, the heating engine 220 may increase the amount and/or length of the heat application by a larger amount compared to the scenario in which the concentration of sulfur only exceeds the threshold concentration by a smaller amount. In some examples, if a rate of change of a concentration of a chemical, such as sulfur, exceeds a threshold rate of change of the concentration of sulfur by a larger amount, the heating engine 220 may increase the amount and/or length of the heat application by a larger amount compared to the scenario in which the rate of change of the concentration of sulfur only exceeds the threshold concentration by a smaller amount. In some examples, if the external temperature is higher, the heating engine 220 may decrease the amount and/or length of the heat application by a larger amount compared to the scenario in which the external temperature is lower. In some embodiments, the heating engine 220 may provide or increase the amount of heat until all concentrations of gases are equal to or below respective thresholds, or, if the concentrations of gases are in steady states. In some examples, if the concentrations of one or more gases are still above respective thresholds, but the concentrations are not decreasing, the heating engine 220 may stop providing or increasing the amount of the heat application.

In some embodiments, the cleaning engine 221 may receive information, from the monitoring engine 216, of the concentrations, and the rates of changes in the concentrations, such as information of whether one or more of the concentrations are higher than respective thresholds, and/or if one or more of the rates of changes of the concentrations are higher than respective second thresholds. In some embodiments, after the ventilating engine 218 and the heating engine 220 apply the ventilation and the heat in the interior of the vehicle 202, the monitoring engine 216 may still determine that some of the one or more of the concentrations remain higher than the respective thresholds. For instance, the concentration of a VOC may still be determined to be higher than a threshold concentration of the VOC. In some embodiments, the cleaning engine 221 may be configured to control one or more cleaning operations in the interior of the vehicle 202, if some of the one or more of the concentrations remain higher than the respective thresholds. In some examples, the cleaning engine 221 may be configured to transport the vehicle 202 to a cleaning station. In some examples, the cleaning engine 221 may be configured to implement controls to release a cleaning compound specific to the one or more chemicals having respective concentrations above respective thresholds. For example, if the cleaning engine 221 receives information that a concentration of a volatile organic compound (VOC) is higher than a respective threshold concentration of the VOC, the cleaning engine 221 may be configured to implement controls to release a compound that neutralizes the VOC into a non-toxic or a non-harmful form, such as reducing the VOC. In some embodiments, the cleaning engine 221 may implement controls to release the cleaning compound when the vehicle 202 is not occupied with people, such as passengers, without releasing the cleaning compound when the vehicle 202 is occupied with people. In some embodiments, the cleaning engine 221 may implement controls to release the cleaning compound regardless of whether people are occupying the vehicle 202. In some embodiments, the cleaning engine 221 may adjust an amount and/or length of a releasing of the cleaning compound based on whether people are occupying the vehicle 202. In some examples, a greater number of people occupying the vehicle 202 may result in the cleaning engine 221 releasing a smaller amount and/or a smaller length or duration of the releasing of the cleaning compound. In some embodiments, the cleaning engine 221 may synchronize the release of the cleaning compound with the ventilation and the heat application, so that the release of the cleaning compound occurs at a same time as the ventilation and the heat application and overlaps with the ventilation and the heat application. In some embodiments, the cleaning engine 221 may regulate an amount and/or length of the releasing of the cleaning compound, based on amounts by which the one or more of the concentrations deviate from the respective thresholds, or amounts by which the one or more rates of changes deviate from the respective second thresholds. In some examples, if a concentration of a chemical, such as sulfur, exceeds a threshold concentration of sulfur by a larger amount, the cleaning engine 221 may increase the amount of the sulfur-specific cleaning compound released, and/or increase the length or duration of the releasing of the sulfur-specific cleaning compound, compared to the scenario in which the concentration of sulfur only exceeds the threshold concentration by a smaller amount. In some examples, if a rate of change of a concentration of a chemical, such as sulfur, exceeds a threshold rate of change of the concentration of sulfur by a larger amount, the cleaning engine 221 may increase the amount and/or length of the releasing of the sulfur-specific cleaning compound compared to the scenario in which the rate of change of the concentration of sulfur only exceeds the threshold concentration by a smaller amount. In some embodiments, the cleaning engine 221 may release specific cleaning compounds until all concentrations of gases are equal to or below respective thresholds, or, if the concentrations of gases are in steady states. In some examples, if the concentrations of one or more gases are still above respective thresholds, but the concentrations are not decreasing, the cleaning engine 221 may stop releasing cleaning compounds.

In some embodiments, the moving engine 222 may receive information, from the monitoring engine 216, of the concentrations, and the rates of changes in the concentrations, such as information of whether one or more of the concentrations are higher than respective thresholds, and/or if one or more of the rates of changes of the concentrations are higher than respective second thresholds. In some embodiments, after the ventilating engine 218, the heating engine 220, and the cleaning engine 221 implement controls in an effort to reduce the concentrations of the gases inside the vehicle 202, the monitoring engine 216 may still determine that some of the one or more of the concentrations remain higher than the respective thresholds. For instance, the concentration of a VOC may still be determined to be higher than a threshold concentration of the VOC. In some embodiments, the moving engine 222 may be configured to control one or more moving operations of the vehicle 202, such as selecting a destination to move the vehicle 202 to, in response to the monitoring engine 216 determining that some of the one or more of the concentrations remain higher than the respective thresholds. In some embodiments, the moving engine 222 may move the vehicle 202 to another destination before the ventilating engine 218, the heating engine 220, and the cleaning engine 221 implement respective controls to ventilate, heat, and clean the vehicle 202. The moving engine 222 may be configured to select a destination based on an air quality index of the destination, a distance to the destination, and a density of vehicles at the destination. In some examples, the moving engine 222 may select, from potential destinations, a nearest destination having an air quality index below a threshold air quality index, and having a density of vehicles below a threshold density of vehicles. In some examples, the moving engine 222 may select, from potential destinations within a radius of a current location of the vehicle 202, a destination having a lowest air quality index.

Figure 3A:
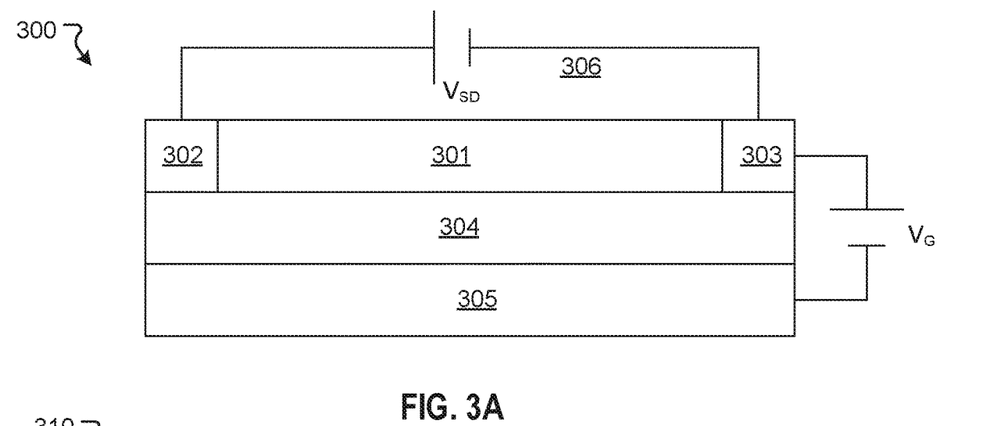
FIGS. 3A-3H illustrate exemplary sensors of the system of FIG. 2.

FIGS. 3A-3H illustrate exemplary sensors included in the monitoring engine 216 of FIG. 2. In FIG. 3A, a sensor 300 may comprise one or more nanotubes or nanowires 301 as a conducting channel, a source 302, a drain 303, a dielectric 304 disposed directly beneath the one or more nanotubes or nanowires 301, a gate electrode 305 disposed directly beneath the dielectric 304, which acts as a barrier between the one or more nanotubes or nanowires 301 and the gate electrode 305, and a path 306 between the source 302 and the drain 303. A current may be measured in the path 306. In some embodiments, when gas molecules are adsorbed onto the one or more nanotubes or nanowires 301, a resulting change in a current across the path 306 may be measured to determine a concentration of the gas molecules. In some embodiments, the source 302 and the drain 303 may comprise one or more metals, the dielectric 304 may comprise $SiO_2$ and the gate electrode 305 may comprise Si. A voltage between the source 302 and the drain 303 may be indicated as $V_{SD}$, and a gate voltage between the drain 303 and the gate electrode 305 may be indicated as $V_G$. In some examples, the one or more nanotubes or nanowires 301 may comprise one or more carbon nanotubes. In some examples, instead of using the one or more nanotubes or nanowires 301, other suitable materials may be used.

Figure 3B:
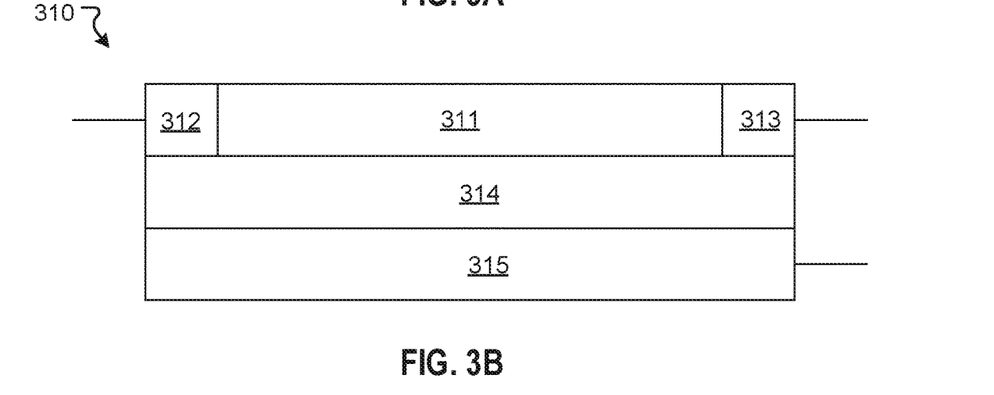

In FIG. 3B, a sensor 310 may comprise a suspended nanotube 311, such as a carbon nanotube, that may vibrate in one or more resonant modes based on offset sinusoidal potentials from a gate electrode 315. When gas molecules are adsorbed onto the suspended nanotube 311, an effective mass of the suspended nanotube 311 may be increased which decreases the resonant frequencies of the suspended nanotube 311. The resonant vibration of the suspended nanotube 311 may be used to detect a concentration of the gas molecules adsorbed onto the suspended nanotube 311. In some embodiments, the sensor 310 may comprise a source 312 and a drain 313 on either side of the suspended nanotube 311. In some embodiments, the sensor 310 may comprise a dielectric 314 beneath the suspended nanotube 311 and a gate electrode 315 beneath the dielectric 314. The dielectric 314 may act as a barrier between the suspended nanotube 311 and the gate electrode 315. In some embodiments, the source 312 and the drain 313 may comprise one or more metals, the dielectric 314 may comprise $SiO_2$ and the gate electrode 315 may comprise Si. In some examples, instead of using the suspended nanotube 301, other suitable materials may be used.

Figure 3C:
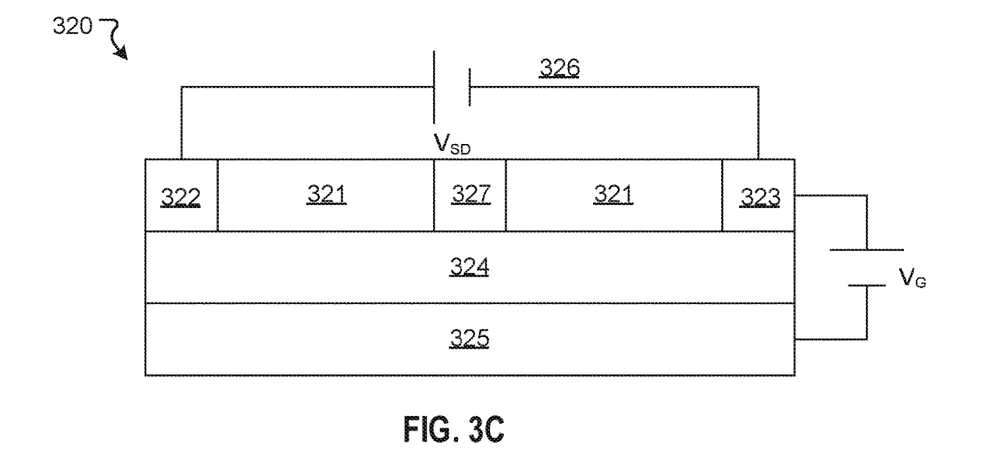

In FIG. 3C, a sensor 320 may comprise electrodes 321 separated by a molecule 327. The electrodes 321 may comprise a single nanotube such as a carbon nanotube, or other suitable materials. The molecule 327 may comprise a conductive molecule, such as a ligand that accesses multiple oxidation states. On opposite sides of the electrodes 321 may be a source 322 and a drain 323. In some embodiments, the sensor 320 may comprise a dielectric 324 beneath the electrodes 321 and a gate electrode 325 beneath the dielectric 324. The dielectric 324 may act as a barrier between the electrodes 321 and the gate electrode 325. In some embodiments, the source 322 and the drain 323 may comprise one or more metals, the dielectric 324 may comprise $SiO_2$ and the gate electrode 325 may comprise Si. A voltage between the source 322 and the drain 323 may be indicated as $V_{SD}$, and a gate voltage between the drain 323 and the gate electrode 325 may be indicated as $V_G$.

Figure 3D:
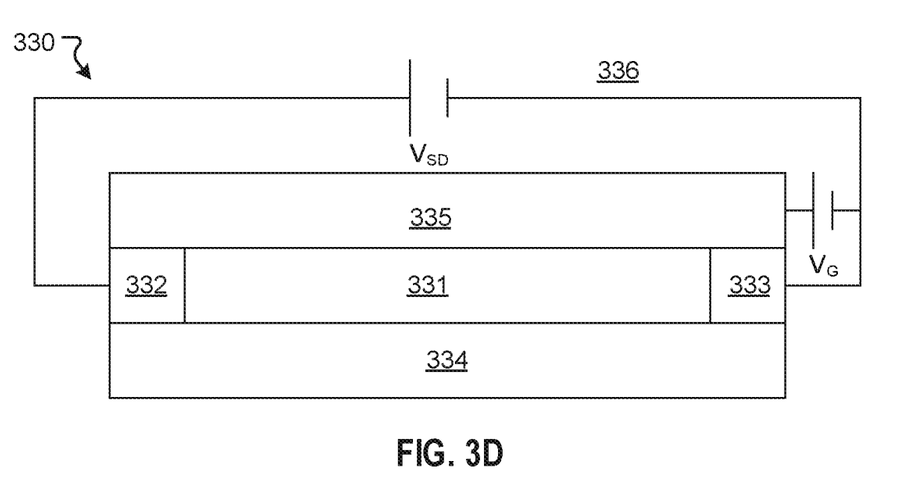

In FIG. 3D, a sensor 330 may comprise one or more nanotubes 331 such as one or more carbon nanotubes. On opposite sides of the one or more nanotubes 331 may be a source 332 and a drain 333. In some embodiments, the sensor 330 may comprise an electrolyte gate 335 disposed above the one or more nanotubes 331. The one or more nanotubes 331 may be asymmetric or symmetric. In some embodiments, the sensor 330 may comprise a substrate 334 disposed below the one or more nanotubes 331. In some embodiments, the source 332 and the drain 333 may comprise one or more metals, and the substrate 334 may comprise silicon. A current may be measured in a path 336 between the source 332 and the drain 333. In some embodiments, when gas molecules are adsorbed onto the one or more nanotubes 331, a resulting change in a current across the path 336 may be measured to determine a concentration of the gas molecules. A voltage between the source 332 and the drain 333 may be indicated as $V_{SD}$, and a gate voltage between the drain 333 and the electrolyte gate 335 may be indicated as $V_G$. In some examples, instead of using the one or more nanotubes 331, other suitable materials may be used.

Figure 3E:
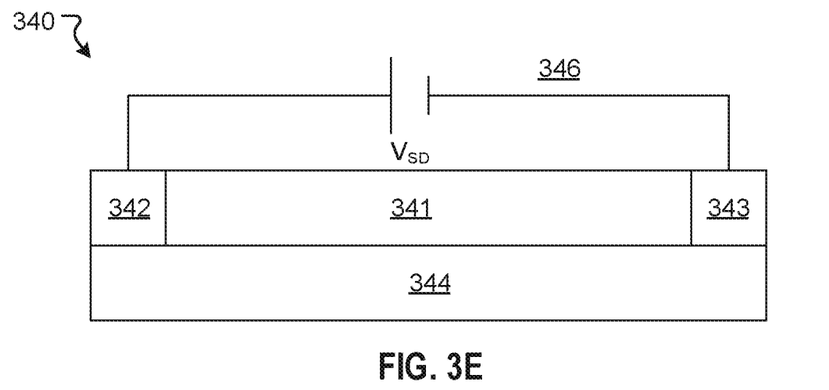

In FIG. 3E, a sensor 340 may comprise one or more nanotubes 341 such as one or more carbon nanotubes. On opposite sides of the one or more nanotubes 341 may be a source 342 and a drain 343. In some embodiments, the sensor 340 may comprise a substrate 344 disposed below the one or more nanotubes 341. In some embodiments, the one or more nanotubes 341 may comprise a p-type material and may be asymmetrically attached with molecular, polymeric, or metallic n-dopants. In some embodiments, the source 342 and the drain 343 may comprise one or more metals, the source 342 and the drain 343 may have different work functions, and the substrate 344 may comprise silicon. In some embodiments, a current may be measured in a path 346 between the source 342 and the drain 343. In some embodiments, when gas molecules are adsorbed onto the one or more nanotubes 341, a resulting change in a current, or a change in resistance, across the path 346 may be measured to determine a concentration of the gas molecules. A voltage between the source 342 and the drain 343 may be indicated as $V_{SD}$. In some examples, instead of using the one or more nanotubes 341, other suitable materials may be used.

Figure 3F:
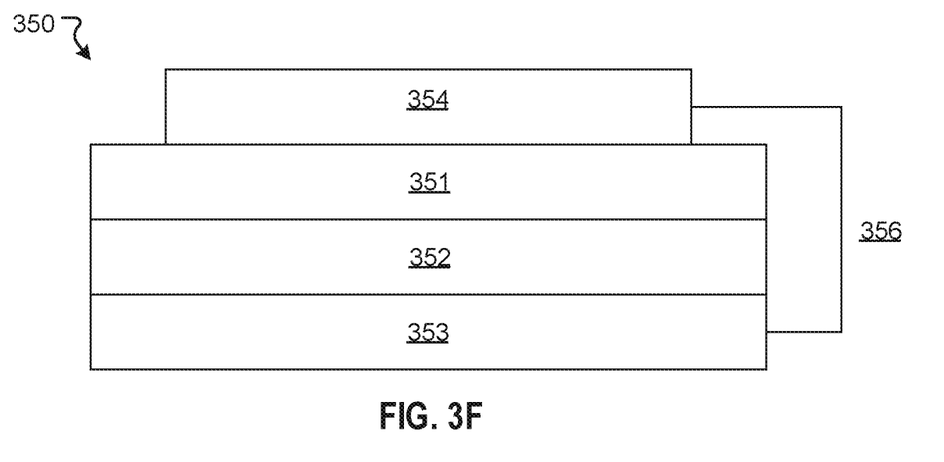
Figure 3G:
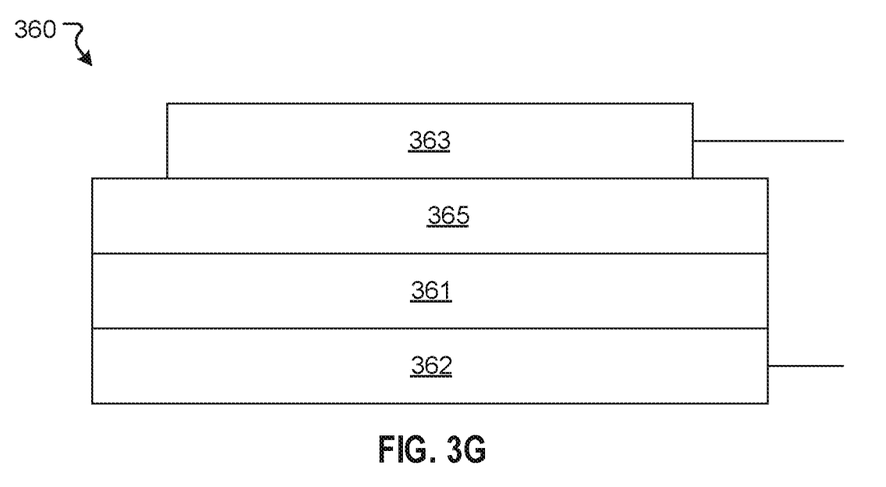

In FIG. 3F, a sensor 350 may comprise one or more nanofilms or nanonetworks 351, a dielectric 352, and electrodes 353 and 354. The nanofilms or nanonetworks 351 may include one or more carbon nanotubes. In some embodiments, a capacitance may be measured across a path 356 between the electrodes 353 and 354 to determine a concentration of the gas molecules, which change a capacitance of the one or more nanofilms or nanonetworks 351 upon adsorption. In some examples, instead of using the one or more nanofilms or nanonetworks 351, other suitable materials may be used. In FIG. 3G, a sensor 360 may comprise one or more nanofilms 361, disposed between a source electrode 362 and an electrolyte 365 separating the one or more nanotubes 361 from a drain electrode 363. The one or more nanofilms 361 may comprise carbon nanotubes. The electrolyte 365 may comprise an aqueous solution, for example, including strong inorganic acids. When a gas adsorbs to the source electrode 362, the gas may be oxidized or reduced, causing a potential of the source electrode 362 to change and a current to flow between the source electrode 362 and the drain electrode 363. In some examples, instead of using the one or more nanofilms 361, other suitable materials may be used.

Figure 3H:
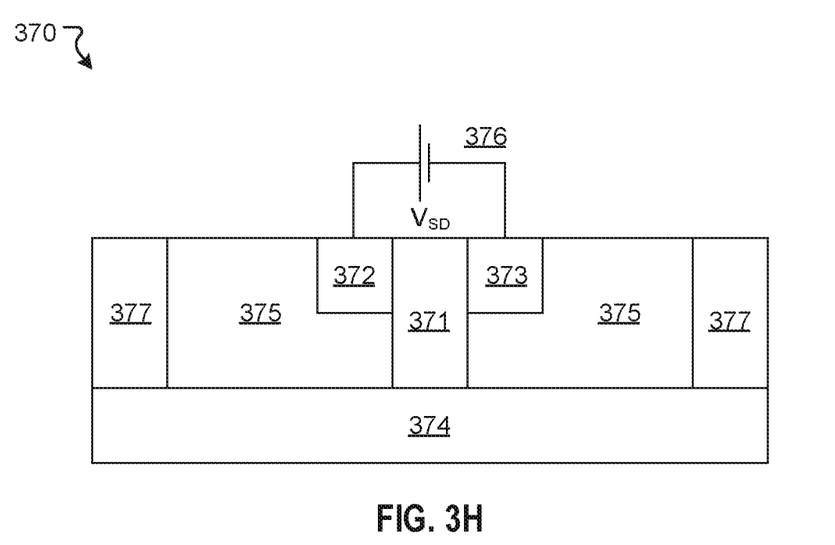

In FIG. 3H, a sensor 370 may comprise a nanotube 371, such as a carbon nanotube, a source 372 and a drain 373 on either side of the nanotube 371, an electrolyte 375, an insulator 377, and a substrate 374. In some embodiments, the nanotube 371 may comprise open ends and function as a pore to separate the source 372 and the drain 373. In some embodiments, a current may be measured in a path 376 between the source 372 and the drain 373. In some embodiments, when gas molecules are adsorbed onto the nanotube 371, and/or the source 372 or the drain 373, a resulting change in a current across the path 376 may be measured to determine a concentration of the gas molecules. In some examples, instead of using the nanotube 371, other suitable materials may be used.

Figure 4:
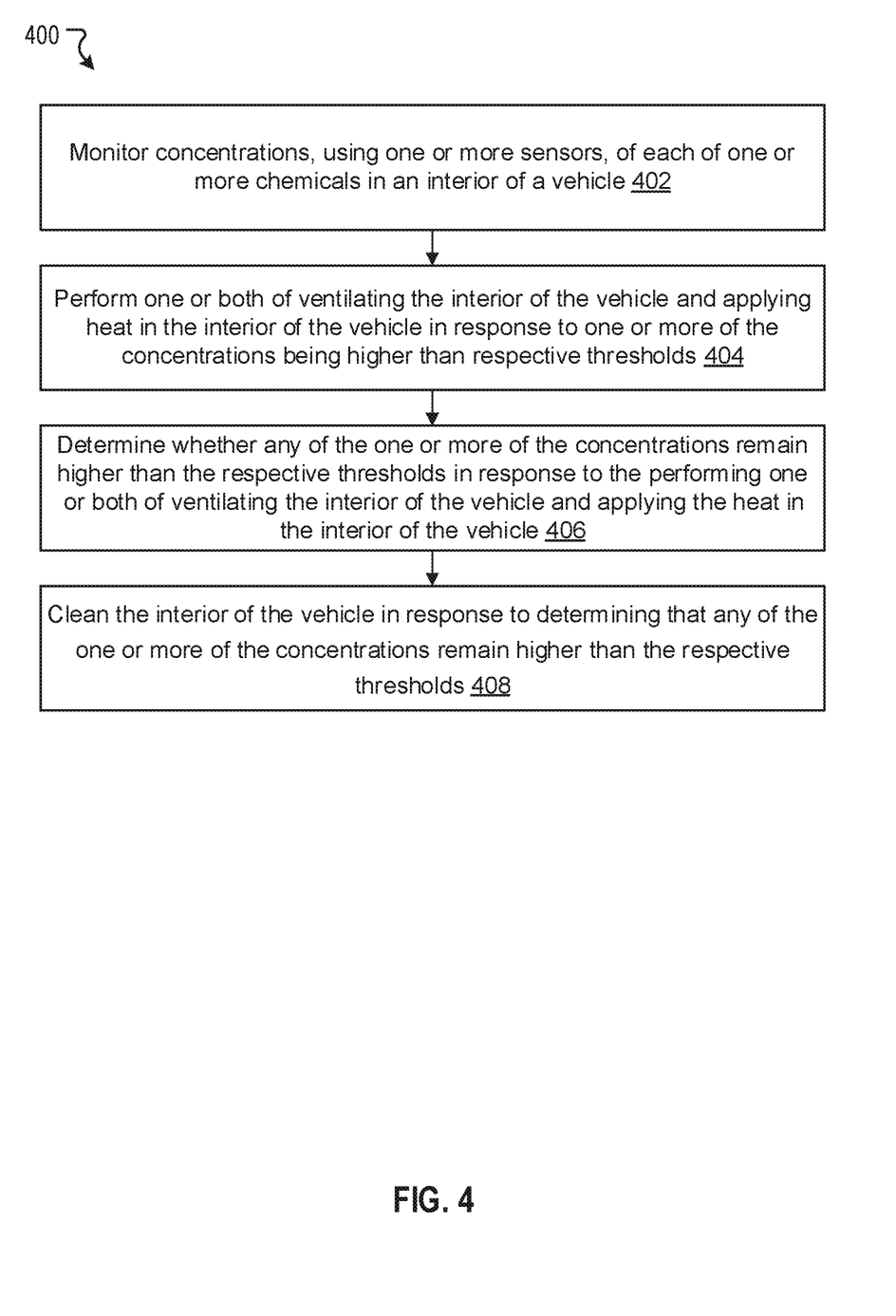
FIG. 4 illustrates a flowchart of an example of a method of coordinating or controlling a ridesharing or robotaxi service, according to some embodiments.

FIG. 4 illustrates a flowchart of a method to determine and select a stop point according to some embodiments. In this and other flowcharts, the flowchart 400 illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity. The description from other FIGS. may also be applicable to FIG. 4.

In step 402, one or more sensors may monitor concentrations of each of one or more chemicals in an interior of a vehicle. In step 404, one or more processors may control performing of one or both of ventilating the interior of the vehicle and applying heat in the interior of the vehicle in response to one or more of the concentrations being higher than respective thresholds. In step 406, the one or more processors may determine whether any of the one or more of the concentrations remain higher than the respective thresholds, in response to the performing one or both of ventilating the interior of the vehicle and applying the heat in the interior of the vehicle. In step 408, the one or more processors may control cleaning of the interior of the vehicle in response to determining that any of the one or more of the concentrations remain higher than the respective thresholds.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
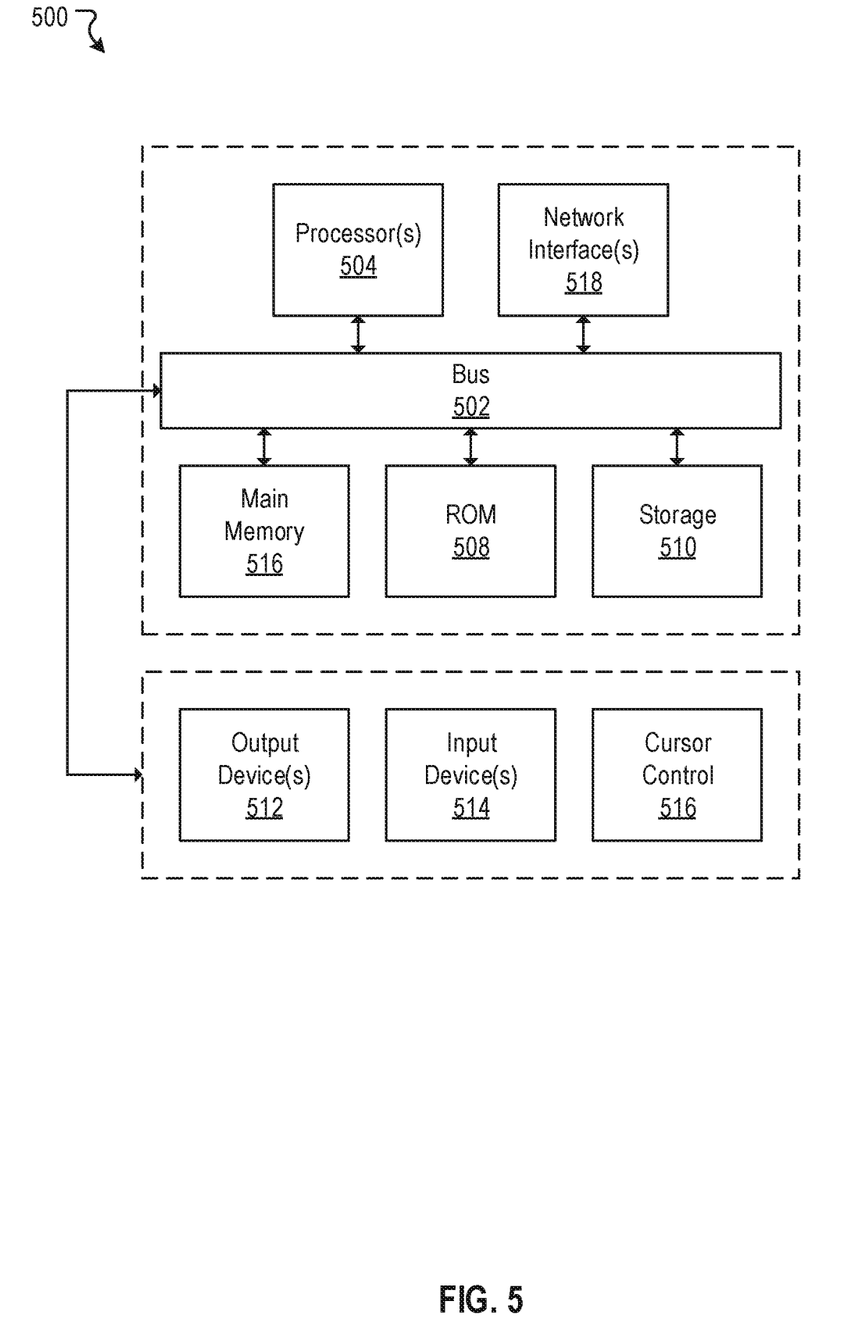
FIG. 5 is a diagram of an example computer system for implementing the features disclosed herein.

FIG. 5 is a block diagram that illustrates a computer system 500 upon which any of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to output device(s) 512, such as a cathode ray tube (CRT) or LCD display (or touch screen), for displaying information to a computer user. Input device(s) 514, including alphanumeric and other keys, are coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may retrieves and executes the instructions. The instructions received by main memory 506 may optionally be stored on storage device 510 either before or after execution by processor 504.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which may include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

For example, "is to be" could mean, "should be," "needs to be," "is required to be," or "is desired to be," in some embodiments.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Although the invention(s) have been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The foregoing description of the present invention(s) have been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system comprising:
   one or more sensors configured to monitor concentrations of each of one or more chemicals in an interior of the vehicle and rates of changes in the concentrations of the each of the one or more chemicals;
   one or more processors; and
   a memory storing instructions that, when executed by the one or more processors, causes the system to perform:
      ventilating the interior of the vehicle or applying heat in the interior of the vehicle in response to one or more of the rates of changes in the concentrations being higher than respective first thresholds;
      in response to the performing the ventilating of the interior of the vehicle or the applying of the heat in the interior of the vehicle, determining whether any of the one or more of the concentrations remain higher than respective second thresholds; and in response to determining that any of the one or more of the concentrations remain higher than the respective second thresholds, cleaning the interior of the vehicle.

2. The system of claim 1, wherein the instructions further cause the system to perform:
in response to determining that any of the one or more of the concentrations remain higher than the respective second thresholds, moving the vehicle to a different location.

3. The system of claim 1, wherein the performing of the ventilating of the interior of the vehicle or the applying of the heat in the interior of the vehicle comprises ventilating the interior of the vehicle by controlling an amount of external air based on respective amounts by which the one or more of the concentrations deviate from the respective second thresholds, and based on an air quality index of the external air.

4. The system of claim 1, wherein at least one of the one or more sensors comprises a nanotube.

5. The system of claim 4, wherein the nanotube is disposed in between a source and a drain, and on top of a dielectric and a gate electrode.

6. The system of claim 4, wherein the nanotube is disposed between an electrolyte and a substrate, and between a source and a drain.

7. The system of claim 1, wherein the one or more chemicals comprise fluorine, benzene, sulfur, formaldehyde, bromine, chlorine, or lead.

8. The system of claim 1, wherein the cleaning the interior of the vehicle comprises cleaning the interior of the vehicle at a cleaning station.

9. The system of claim 1, wherein the cleaning the interior of the vehicle comprises releasing a cleaning compound specific to the one or more chemicals having the respective concentrations above the respective second thresholds.

10. The system of claim 2, wherein the moving the vehicle to a different location comprises determining a destination to move the vehicle to based on an air quality index of the destination, a distance to the destination, and a density of vehicles at the destination.

11. A method implemented by a computing system including one or more sensors, one or more processors and storage media storing machine-readable instructions, the method comprising:
monitoring concentrations and rates of change of concentrations, using one or more sensors, of each of one or more chemicals in an interior of a vehicle;
ventilation the interior of the vehicle or applying heat in the interior of the vehicle in response to one or more of the rates of changes in the concentrations being higher than respective first thresholds;
in response to the performing the ventilating of the interior of the vehicle or applying of the heat in the interior of the vehicle, determining whether any of the one or more of the concentrations remain higher than the respective first thresholds; and
in response to determining that any of the on or more of the concentrations remain higher than the respective first thresholds, moving the vehicle to a different location wherein the different location is determined based on an air quality index (AQI) and a density of vehicles at the different location.

12. The method of claim 11, further comprising:
monitoring rates of changes, using the one or more sensors, in the concentrations of each of the one or more chemicals in the interior of the vehicle; and
wherein the
performing of the ventilating of the interior of the vehicle or applying of the heat in the interior of the vehicle is in response to one or more of the rates of changes being higher than second respective thresholds.

13. The method of claim 11, wherein the performing of the ventilating of the interior of the vehicle or the applying of the heat in the interior of the vehicle comprises ventilating the interior of the vehicle by controlling an amount of external air based on respective amounts by which the one or more of the concentrations deviate from the respective thresholds, and based on an air quality index of the external air.

14. The method of claim 11, wherein the monitoring the concentrations of each of one or more chemicals in an interior of the vehicle comprises monitoring using a sensor comprising a nanotube.

15. The method of claim 14, wherein the monitoring comprises monitoring using the sensor comprising the nanotube disposed between a source and a drain, and on top of a dielectric and a gate electrode.

16. The method of claim 11, wherein the monitoring the concentrations of each of one or more chemicals in the interior of the vehicle comprises monitoring the concentrations of fluorine, benzene, sulfur, formaldehyde, bromine, chlorine, or lead.

17. The method of claim 11, wherein the cleaning the interior of the vehicle comprises cleaning the interior of the vehicle at a cleaning station.

18. The method of claim 11, wherein the cleaning the interior of the vehicle comprises releasing a cleaning compound specific to the one or more chemicals having respective concentrations above respective thresholds.

* * * * *